(12) United States Patent
Liu

(10) Patent No.: US 6,491,248 B1
(45) Date of Patent: Dec. 10, 2002

(54) MEASURING TAPE HAVING CHECK DEVICE FOR AUTOMATICALLY PREVENTING RULER FROM REWINDING

(76) Inventor: Simon Liu, 235 Chung-Ho, Box 8-24, Taipei (TW)

( * ) Notice: Subject to any disclaimer, the term of this patent is extended or adjusted under 35 U.S.C. 154(b) by 0 days.

(21) Appl. No.: 09/933,543

(22) Filed: Aug. 21, 2001

(51) Int. Cl.$^7$ .............................. B65H 75/30; G01B 3/10
(52) U.S. Cl. ................................ 242/381.3; 242/384.7; 33/767
(58) Field of Search ............................... 242/381, 381.1, 242/381.2, 381.3, 381.6, 382, 384.7, 385, 385.1, 396, 396.1, 410, 396.2, 396.4; 33/755, 760, 767, 761, 769, 768, 770

(56) References Cited

U.S. PATENT DOCUMENTS

| | | | | |
|---|---|---|---|---|
| 473,255 A | * | 4/1892 | Hartman | 242/381.3 |
| 5,002,003 A | * | 3/1991 | Blue | 242/381.3 |
| 5,245,761 A | * | 9/1993 | Waldherr | 33/767 |
| 5,395,069 A | * | 3/1995 | Chen | 242/381.3 |
| 5,820,057 A | * | 10/1998 | Decarolis et al. | 242/381.6 |

* cited by examiner

*Primary Examiner*—William A. Rivera

(57) ABSTRACT

A measuring tape has a check device for automatically preventing a ruler from rewinding. The check device is installed within the casing and positioned between a winding wheel and a ruler body. The check device comprises a rotary wheel formed by an elastic wheel and two ratchets; a guide block having stop blocks; a stop claw; a driven element installed between the press button and the stop claw; and a press. By above components, the ruler body can be installed between the elastic wheel and the guide block. As the ruler body is pulled out, it can be stopped automatically. Only after pressing the press button, the ruler body rewinds. Thereby, the user may operate it by only one hand not to worry about that the hand will be hurt due to the rewinding of the ruler body.

7 Claims, 6 Drawing Sheets

MEASURING TAPE HAVING CHECK DEVICE FOR AUTOMATICALLY PREVENTING RULER FROM REWINDING

BACKGROUND OF THE INVENTION

1. Field of the Invention

The present invention relates to a measuring tape, and particularly to a measuring tape having a check device for automatically preventing a ruler from rewinding. As a ruler body is pulled out, it can be stopped automatically. After pressing a press button, the ruler body rewinds by the elastic force of the reed. Thereby, the user operates it by only one hand not to worry about that the hand will be hurt due to rewinding of the ruler body.

2. Description of Related Art

The prior measuring tape is installed with a check device. When the ruler body is pulled out, the ruler body will rewind due to the winding spring in the winding wheel. Therefore, a check device is used to fix the ruler body and prevent the ruler body from rewinding. There are two kinds of check devices. One is a positioning switch which is a press button having two operation stages. As the press button is pressed backwards, the ruler body will be positioned and the winding wheel stops to rotate, while as the press button is pressed forwards, the ruler body will be released and the winding wheel rotates to rewind the ruler body. The second kind is an intermittent operation switch. In this switch, a button is pressed by a finger. When the button is pressed continuously, the winding wheel will be stopped so as not to rotate, while if the button is released, the ruler body will rewind.

In general, only one hand is used to pull the ruler body. In pulling the ruler body, it is necessary to prevent the ruler body from rewinding, otherwise, the measurement work can not be executed. Therefore, the thumb and first finger must pinch the casing of the ruler body tightly, and another hand serves to pull the ruler body continuously. However, it is often that the hand is hurt since the finger and thumb release the ruler body carelessly. This is dangerous to the users, especially, children.

SUMMARY OF THE INVENTION

Accordingly, the primary object of the present invention is to provide a measuring tape having a check device for automatically preventing a ruler from rewinding, wherein only after pressing a press button, the ruler body rewinds. Thereby, the user may operate it by only one hand not to worry about that the hand will be hurt due to the rewinding force of the ruler body.

Another object of the present invention is to provide a measuring tape having a check device for automatically preventing a ruler from rewinding, wherein when a user presses a press button by a thumb, a block will push the press plate downwards. Then the press plate presses the resisting plate of the stop claw. Thereby, claw pieces will curl upwards and then separates from the ratchets. Therefore, the rotary wheel will separate from the claw pieces to be in a free condition.

A further object of the present invention is to provide a measuring tape having a check device for automatically preventing a ruler from rewinding, wherein the rewinding of the ruler body is by pressing a button, and thus the operation is simple and safe. Moreover, in rewinding the ruler body, the button can be pressed properly so that the ruler body rewinds slowly.

A further object of the present invention is to provide a measuring tape having a check device for automatically preventing a ruler from rewinding, wherein the user may pull the ruler body rapidly, thereby, the operation time is reduced.

To achieve above objects, the present invention provides measuring tape having a check device for automatically preventing a ruler from rewinding. The check device is installed within the casing and positioned between a winding wheel and a ruler body. The check device comprises a rotary wheel formed by an elastic wheel at a center portion and two ratchets at two sides of the elastic wheel; a guide block formed at a lower end of the rotary wheel and having stop blocks; a stop claw; a driven element installed between the press button and the stop claw; and a press. By above components, the ruler body can be installed between the elastic wheel and the guide block. As the ruler body is pulled out, it can be stopped automatically.

The various objects and advantages of the present invention will be more readily understood from the following detailed description when read in conjunction with the appended drawing.

DETAILED DESCRIPTION OF THE PREFERRED EMBODIMENTS

Figure 1:
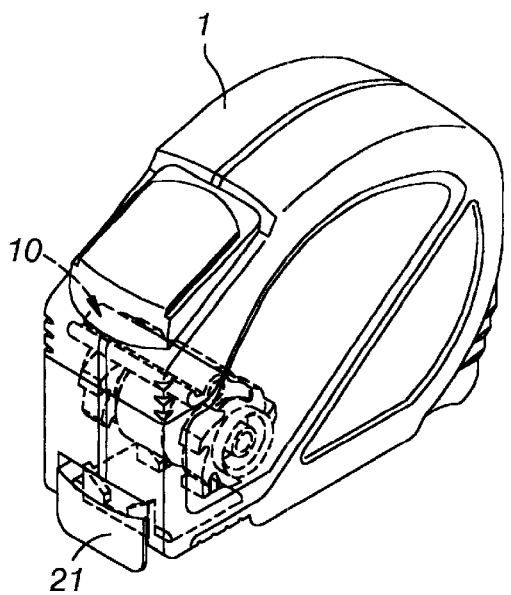
FIG. 1 is a perspective view of the measuring tape of the present invention.

The embodiment of the present invention will be described hereinafter.

A perspective view of the measuring tape of the present invention is illustrated in the following description. The casing 1 is formed by a left casing and a right casing. A check device 10 is installed in the front side of the casing 10. The check device 10 is located between an output end of a ruler body 2 and the winding plate for fixing the ruler body. The check device 10 includes (referring to FIG. 2) a press button 11, a press plate 12, a stop claw 13, a reed 14 (a press), a rotary wheel 15 and a slide stop 16. The center of the rotary wheel 15 has an elastic wheel and two ends thereof have stop means for ratchets. The details are described in FIG. 3. The rotary wheel 15 is formed by an elastic friction wheel 151, a left wheel rod 152 and a right wheel rod 153. The interior of the friction wheel 151 has a hollow tooth groove 152b. A tooth rod 153 may insert into the tooth groove 153. Two wheel rods 152 and 153 are installed with single direction ratchets 152a and 153a at the outer sides thereof. The end walls of the two ratchets have recess 152c and 153c, respectively, and central shafts 152d and 153d, respectively (also referring to FIG. 5).

Figure 2:
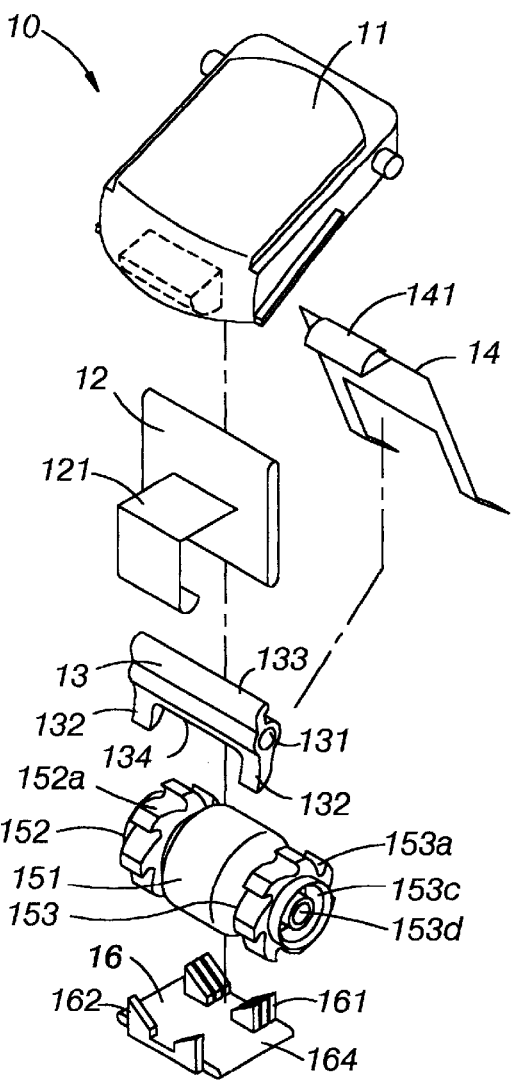
FIG. 2 is an exploded perspective view of the check device in the present invention.
Figure 3:
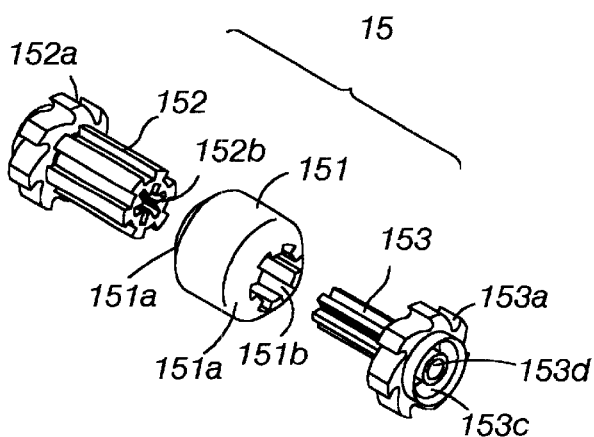
FIG. 3 is an exploded perspective view of the check device in the present invention.
Figure 4:
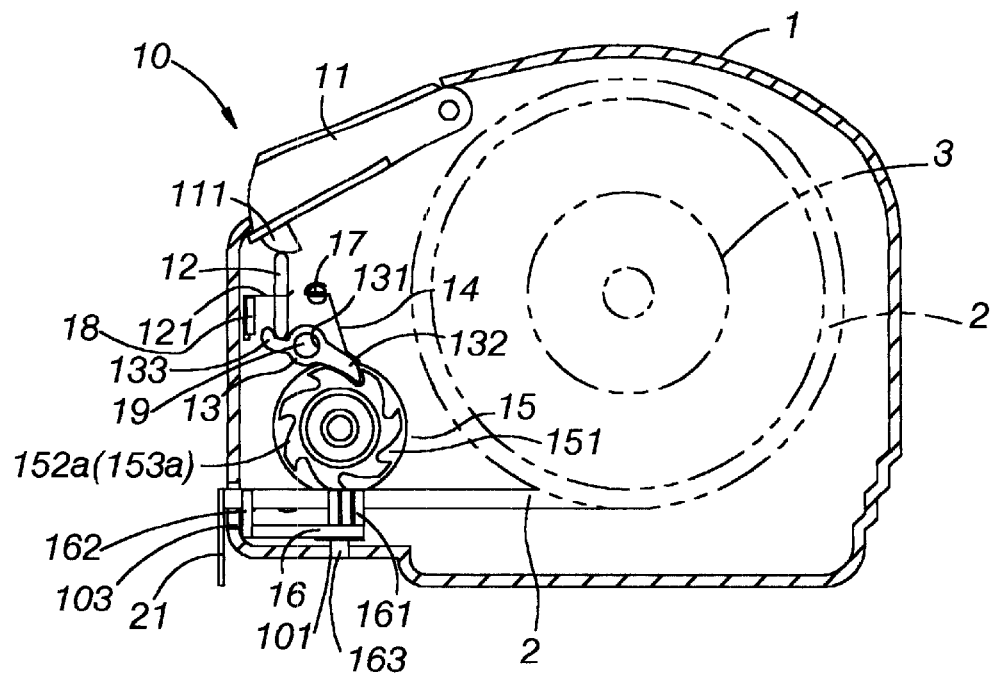
FIG. 4 is a cross sectional view of the rotary wheel in the present invention.

Referring to FIGS. 2 and 4, FIG. 4 is a cross sectional view of the ruler of the present invention. The related position after the check device 10 is assembled is illustrated. The press button 11 is protruded from the front upper end of the casing 1. The bottom of the press button 11 is extended with a block 111. The block 111 is adhered to the press plate 12. The press plate 12 is a driven element. By the reed 121 to fix the structure, the press plate 12 is in contact with the resisting plate 133 of the stop claw 13. The reed 121 is installed on a clamping block 18 installed on the casing. The reed 121 is an elastic restoring element, which may cause that the press plate 12 has a restoring function.

The central pivot hole 131 of the stop claw 13 may be pivotally installed with a pivotal shaft 19. The left and right ends of the front end of the stop claw 13 have claw pieces 132 which are able to be engaged with the unidirectional ratchets 152a and 153a. A notch 134 is formed between the two claw pieces 132 so not to contact the friction wheel 151. The resisting plate 133 at the rear end is in contact with the press plate 12.

The reed 14 is installed above the stop claw 13. A clip 141 hangs the reed 14 to the shaft 17. The pins at the left and right sides of the reed 14 presses the claw pieces 132 so that it is difficult that the claw pieces 132 moves upwards. Therefore, the reed 14 is an elastic press element of the stopper 13.

The guide block 16 is installed at a lower end of the rotary wheel 15. The guide block 16 is formed by a plurality of rear stop block 161 and a plurality of front stop block 162. The rear stop blocks 161 are symmetrically disposed at the left and right sides. A gap is formed between two stop blocks 161, and the top of each stop block 161 is a tilt surface so that a V shape is formed between two stop blocks 161. Each front stop blocks 162 has the same configuration as the rear stop block 161. However, the rear stop blocks 161 has a gap with the friction wheel 151 for guiding the ruler body 2 (referring to FIG. 5). The ruler body 2 may be in contact with the friction wheel 151 and the rear stop blocks 161 properly and thus a friction force is generated. Since the cross section of the ruler body 2 has a cambered shape which may increase the stress of the ruler body). The V shapes formed by the stop blocks 161 and 162 may generate preferred surface to be in contact with the ruler body 2. The tilt surfaces 151a at two lateral sides of the friction wheel 151 properly contact the ruler body 2. The front stop blocks 162 serves to guide the movement of the ruler body 2 so that the ruler body 2 does not shift or rub the edge of an outlet.

Figure 5:
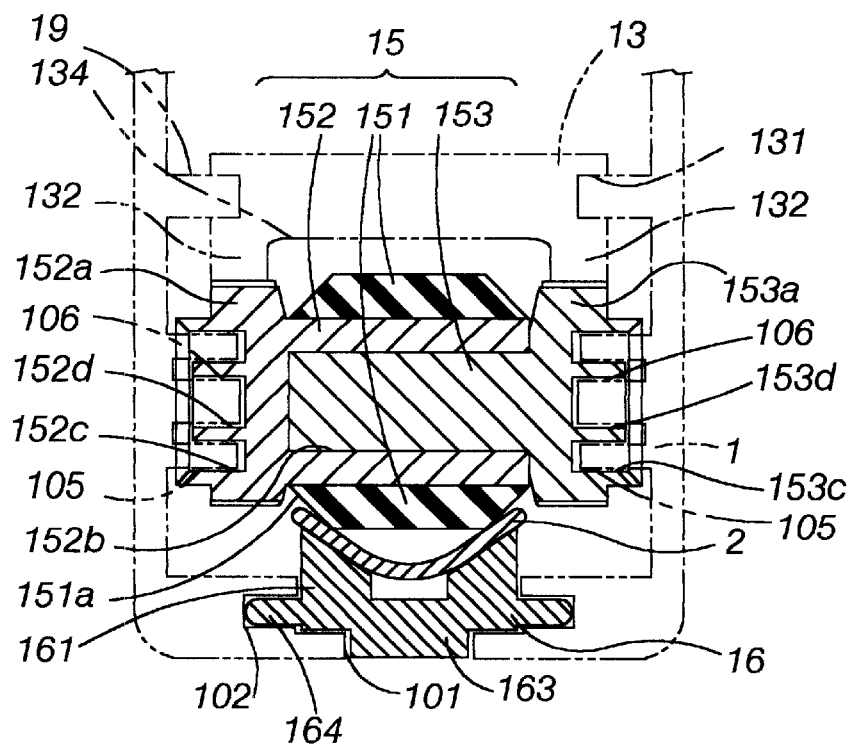
FIG. 5 is a cross sectional view showing the check device and the ruler body of the present invention.

A whole cross sectional view of the check device 10 is illustrated in FIG. 5. The bottom of the guide block 16 has a tenon 163 which may be embedded into the engaging groove 101 at the bottom of the casing. The two edges 164 of the guide block 16 may be guided into the guide grooves 102 at the bottom of the casing 1 so that the guide block 16 is steadily installed at the lower surface of the casing 1. Next, two recesses 152c and 153c at the lateral sides of the ratchets and the central shafts 152d and 153c are matched to a ring 105 and a protruded shaft 106. Thereby, the rotary wheel 15 may rotate through 360 degrees.

Figure 6:
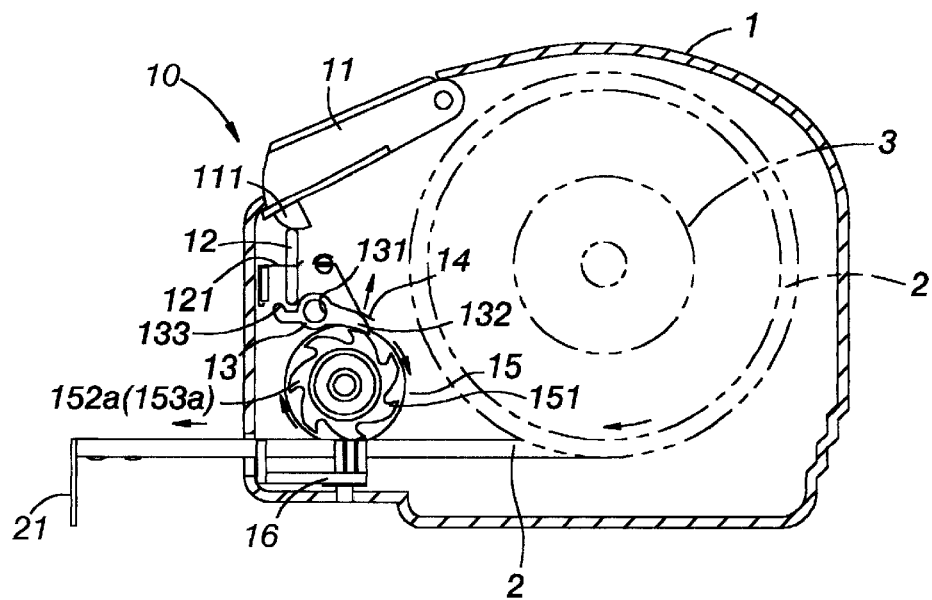
FIGS. 6 to 8 show the operation of the check device of the present invention.
Figure 7:
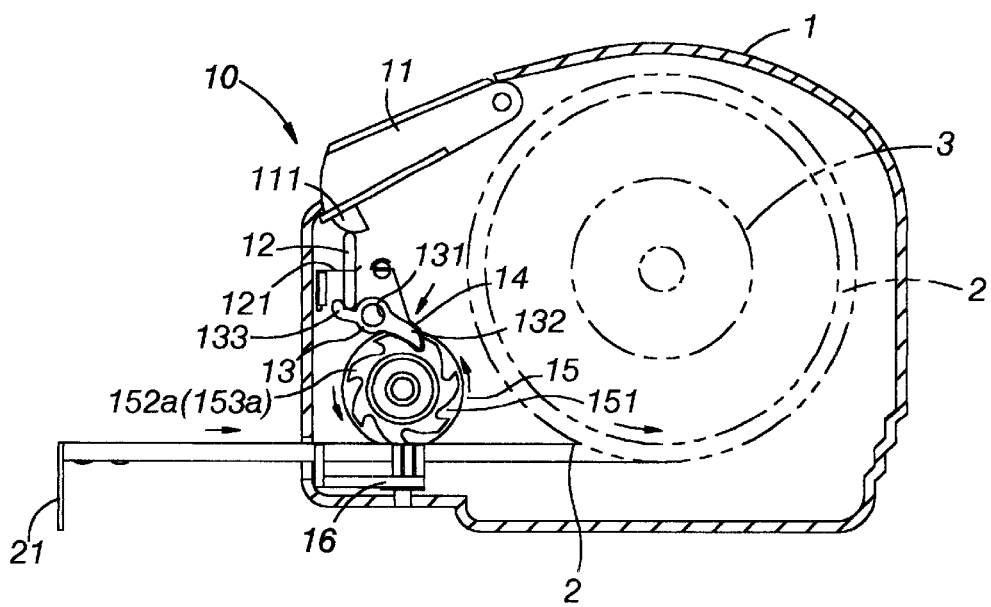
Figure 8:
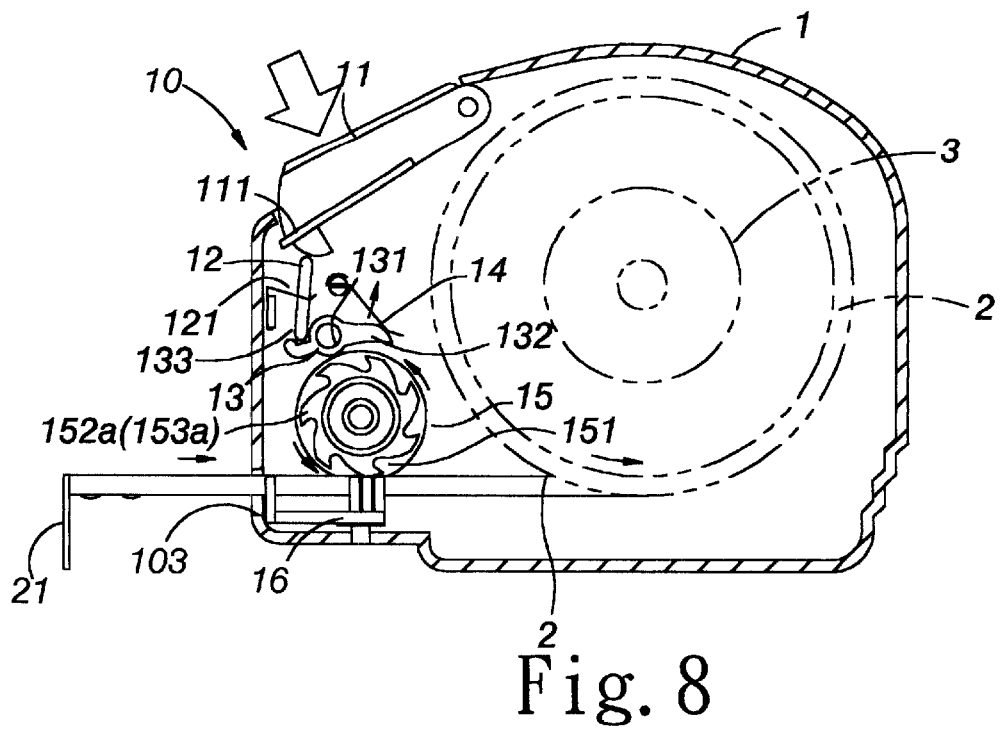

Referring to FIGS. 6 to 8, the operation of the check device of the ruler in the present invention is illustrated. At first, referring to FIG. 6, when the ruler body 2 is pulled out from the casing 1, the rotary wheel 15 is driven to rotate clockwise (referring to the figure). Then ratchets 152a and 153a push the claw pieces 132 so that the claw pieces 132 may adhere to the outer edges of the ratchets 152a and 153a to rotate with the hatchets.

Referring to FIG. 7, when the ruler body 2 stops (no force applies thereon). The ruler body 2 generates a restoring action due to the action of the winding spring. Then, the ruler body 2 will drive the rotary wheel 15 to rotate counterclockwise. The reed 14 presses downwards so that the claw pieces 132 will be engaged with the ratchets 152a and 153a, Thereby, the two ratchets 152a and 153a will stop to rotate. Thereby, the ruler body 2 is stopped by the friction wheel 151 and thus does not rewind.

Referring to FIG. 8, when the user presses the press button 11 by a thumb, the block 111 under the press button 11 will push the press plate 12 downwards. Then the press plate 12 presses the resisting plate 133 of the stop claw 13. Thereby, the claw piece 132 at another end of the stop claw 13 will curl upwards and then separates from the ratchets 152a and 153a. Therefore, the rotary wheel 15 will separate from the claw pieces to be in a free condition. The ruler body 2 returns to the casing 1 due to the winding spring of the winding wheel 3 until a head 21 is stopped at the outlet end 103. The rotary wheel 15 rotates counterclockwise due to the rewinding operation of the ruler body 2 until the ruler body 2 stops to rewind. After the ruler body 2 has been rewound, the press button 11 is released. Then the claw pieces 132 are engaged with the ratchets 152a and 153a due to a pressing-down force of the reed 14 so as to achieve an stop effect. Furthermore, another end of the stop claw 13 will lift upwards, and the press button 11 moves upwards due to the restoring force of the press plate 12 so as to return to the condition illustrated in FIG. 4.

Figure 9:
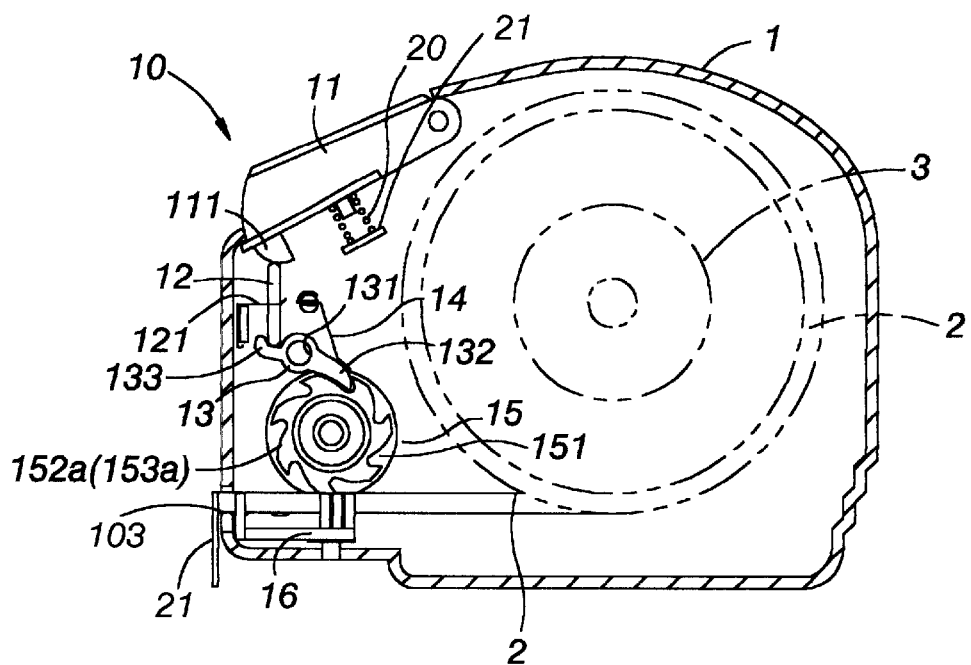
FIG. 9 shows another embodiment of the present invention.

Referring to FIG. 9, another embodiment of the present invention is illustrated. To increase the force for moving the press button 11 upwards and reduce the burdens of the reeds 14 and 121, the lower end of the press button 11 can be installed with a restoring spring 20 which is fixed to a resisting block 21 installed on the casing 1. Therefore, the press button 11 has preferred pressing and restoring effects.

Figure 10:
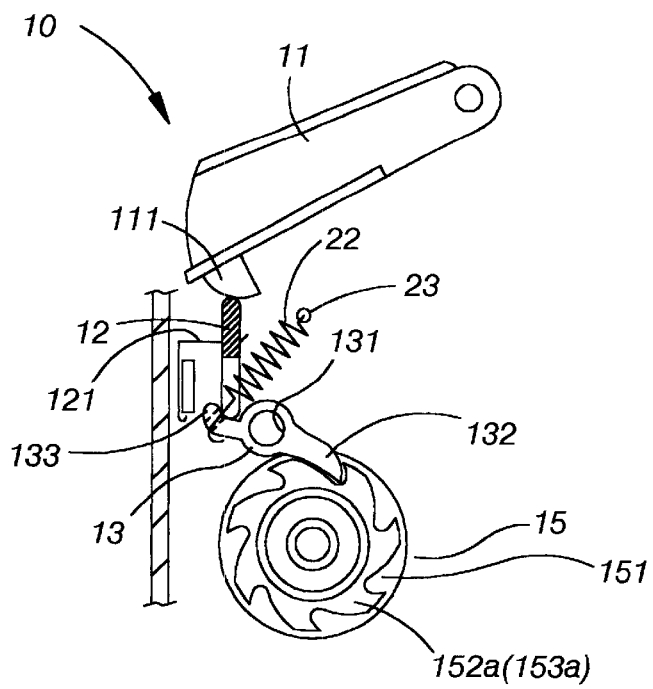
FIG. 10 shows another embodiment of the check device in the present invention.

FIG. 10 shows another embodiment of the check device according to the present invention. In this embodiment, a compressing spring 22 is used to replace the reed 14. The compressing spring 22 is installed above the stop claw 13. One end thereof passes through a through hole at the lower end of the press plate 12 to be connected to the resisting plate 133 of the stop claw 13, and another end thereof is connected to a post 23 installed on the casing 1. Thereby, the stop claw 13 has a preferred fixing effect.

Figure 11:
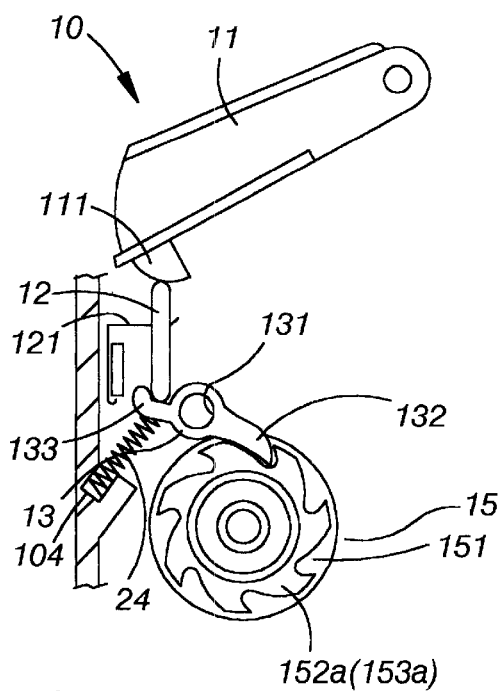
FIG. 11 shows another embodiment of the check device in the present invention.
Figure 12:
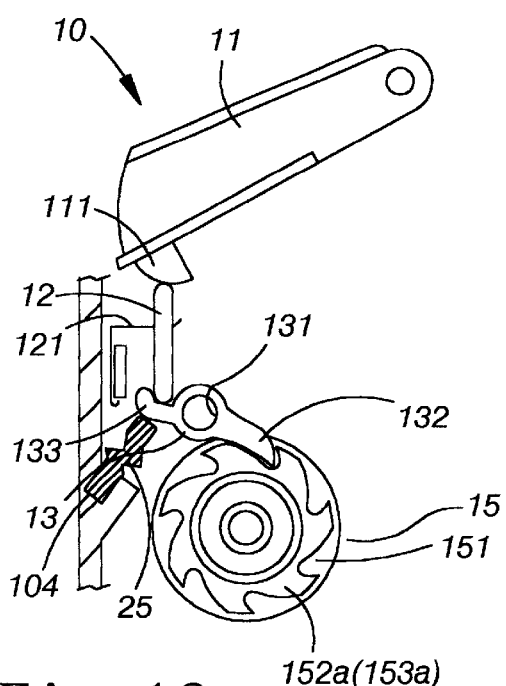
FIG. 12 shows another embodiment of the check device in the present invention.

Another embodiment of the check device according to the present invention is illustrated in FIG. 11. In this embodiment, a restoring spring 24 is used to replace the original reed 14. The restoring spring 24 is installed at the lower side of the stop claw 13, and the upper end thereof resists against the resisting plate 133 of the stop claw 13. The lower end thereof is fixed in the recess 104 of the casing. Thereby, the stop claw 13 has a preferred fixing function.

Figure 13:
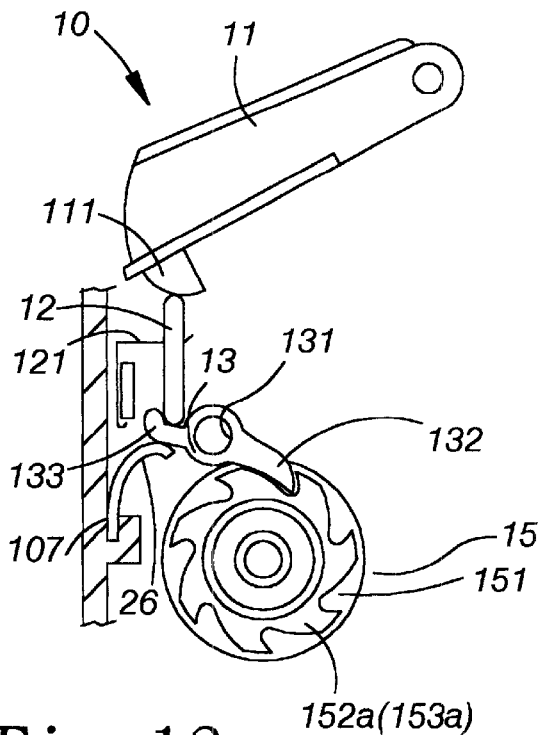
FIG. 13 shows another embodiment of the check device in the present invention.
Figure 14:
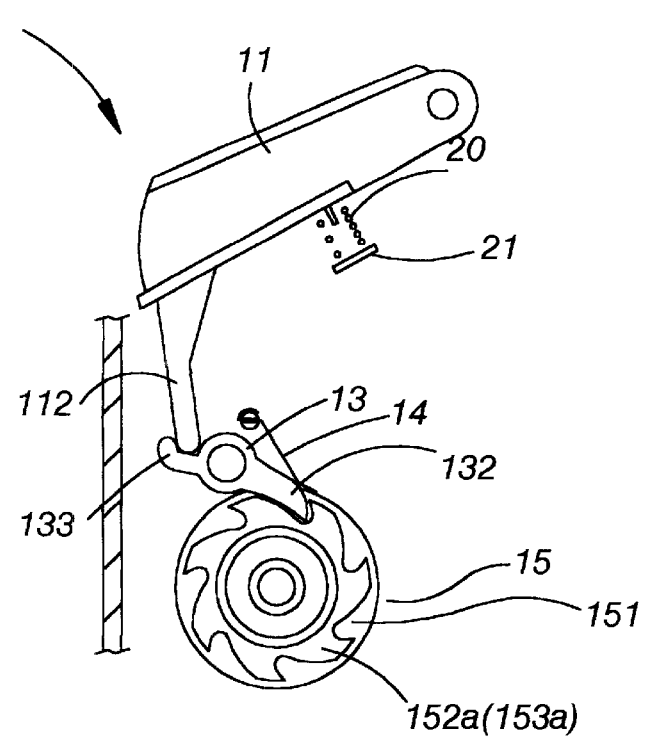
FIG. 14 shows another embodiment of the check device in the present invention.

Another embodiment about the check device of the present invention is illustrated in FIG. 14. In this the present invention, an elastic tape 25 is utilized to replace the original reed 14. The elastic tape 25 is installed below the stop pieces 132. The upper end thereof resists against the resisting plate 133 of the stop claw 13, and the lower end thereof is connected in the recess 104 of the casing. Thereby, the stop claw 13 has a preferred fixing function. Furthermore, FIG. 13 discloses a cambered elastic reed 26 which is utilized to replace the reed 24. The cambered elastic reed 26 is fixed to the inserting groove 107 which is installed on the casing 1.

Referring to FIG. 14, the front lower end of the press button 11 is connected with a long press plate 112. The long press plate 112 is utilized to replace the original press plate 12 (i.e., the driven element) so as to contact the resisting plate 133 of the stop claw 13. An expanding spring 22 is installed below the press button 11 and a stop block 21 for fixing the expanding spring 22.

In summary, in the present invention, the ruler body 2 is pulled to have a check function so as not to rewind. After the press button is pressed, the ruler body 2 may rewind automatically. However, there are many ways for driving the press button 11 and the stop claw 13, all stopping means connecting the stop claw 13, rotary wheel 15 and guide block 16 are within the scope of the present invention.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A measuring tape having a check device for automatically preventing a ruler from rewinding, the check device being installed within a casing; the check device being positioned between a winding wheel and a ruler body and being controlled by a press button above a casing, the check device comprising:

a rotary wheel formed by an elastic wheel at a center portion and two unidirectional ratchets at two sides of the elastic wheel; the rotary wheel being pivotally installed within the casing and in contact with a surface of the ruler body before the winding wheel;

a guide block formed at a lower end of the rotary wheel and having stop blocks; the stop blocks and the elastic wheel being in contact with an upper surface and a lower surface of the ruler body so as to generate a friction force;

a stop claw pivotally installed on the rotary wheel; one end of the stop claw having claw pieces capable of being engaged to the unidirectional ratchets of the rotary wheel, and another end thereof extending from a resisting plate;

a driven element installed between the press button and the stop claw; a lower end the driven element being in contact with the resisting plate of the stop claw; and a press being an elastic element for causing the claw pieces of the stop claw to press downwards; the press being elastic for restoring to a origin state;

wherein when the ruler body is pulled, by the effect of the check device, the ruler body will not rewind automatically.

2. The measuring tape having a check device for automatically preventing a ruler from rewinding as claimed in claim 1, wherein the elastic wheel is formed by an elastic friction wheel and two wheel rods at a left side and a right side of the friction wheel; the left wheel rod is inserted into the friction wheel, and the right wheel rod is inserted into the left wheel rod; and lateral sides of the left and right wheel rods are installed with the unidirectional ratchets, respectively.

3. The measuring tape having a check device for automatically preventing a ruler from rewinding as claimed in claim 1, wherein the stop blocks are rear stop blocks; the rear stop blocks are symmetrically disposed at left and right sides of the guide blocks; a gap is formed between each two stop blocks, and a top of each stop block is a tilt surface so that a V shape is formed between each two stop blocks.

4. The measuring tape having a check device for automatically preventing a ruler from rewinding as claimed in claim 3, wherein the stop blocks are front stop blocks; the front stop blocks are symmetrically disposed at left and right sides of the guide blocks; and a top of each block is a tilt surface so that a V shape is formed between two stop blocks.

5. The measuring tape having a check device for automatically preventing a ruler from rewinding as claimed in claim 1, wherein the driven element is combined with the press button.

6. The measuring tape having a check device for automatically preventing a ruler from rewinding as claimed in claim 1, wherein an elastic restoring element is installed below the press button.

7. The measuring tape having a check device for automatically preventing a ruler from rewinding as claimed in claim 1, wherein the driven element is fixed by a reed and has an elastic restoring function.

* * * * *